Nov. 29, 1966  K. H. HACHMUTH  3,288,878
FLUIDIZED DEHYDROGENATION PROCESS AND APPARATUS
Filed Jan. 28, 1964  4 Sheets-Sheet 1

INVENTOR.
K. H. HACHMUTH
BY
Young & Quigg
ATTORNEYS

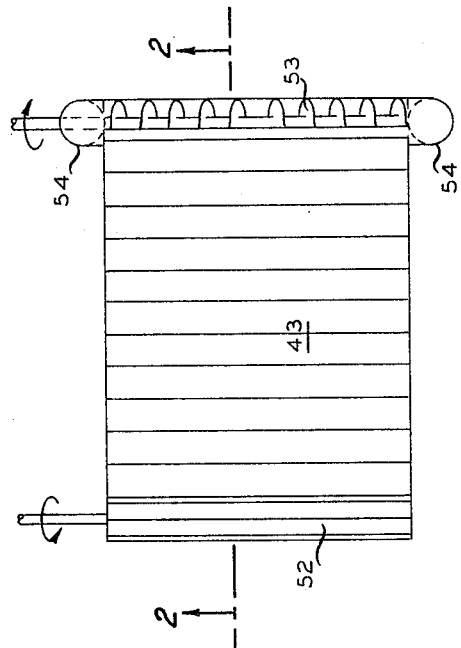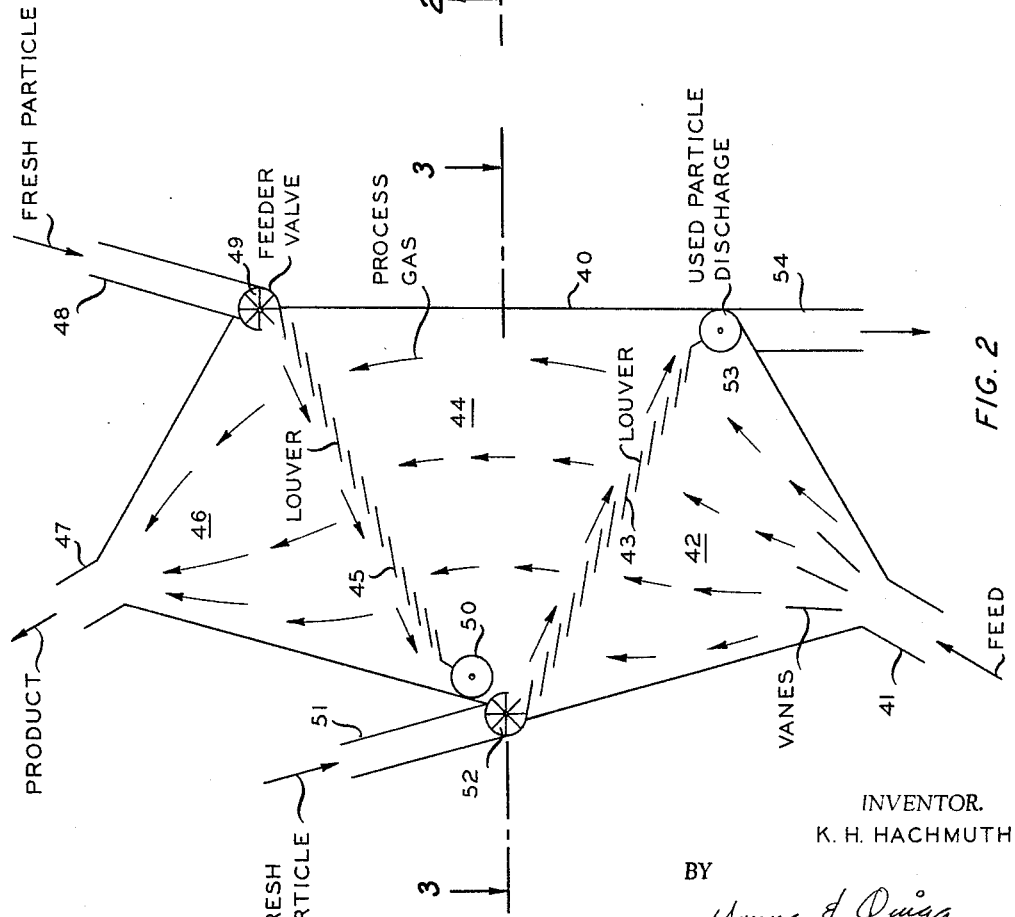

INVENTOR.
K. H. HACHMUTH
BY
Young & Quigg
ATTORNEYS

Nov. 29, 1966     K. H. HACHMUTH     3,288,878
FLUIDIZED DEHYDROGENATION PROCESS AND APPARATUS
Filed Jan. 28, 1964                                4 Sheets-Sheet 4

TRAY CONTOURS, CATALYST TEMPERATURE PROFILES, AND TOTAL CONVERSION PROFILE IN n-BUTANE DEHYDROGENATION WITH TWO-TRAY REACTOR.

INVENTOR.
K. H. HACHMUTH
BY
Young & Quigg
ATTORNEYS

United States Patent Office 3,288,878
Patented Nov. 29, 1966

3,288,878
FLUIDIZED DEHYDROGENATION PROCESS AND APPARATUS
Karl H. Hachmuth, Bartlesville, Okla., assignor to Phillips Petroleum Company, a corporation of Delaware
Filed Jan. 28, 1964, Ser. No. 340,659
10 Claims. (Cl. 260—683.3)

This invention relates broadly to the contacting of fluid streams with sub-divided solid particles. In one aspect, this invention relates to an improved method and means for effecting the conversion of a reactant medium, such as a hydrocarbon stream, in the presence of multiple, shallow fluidized beds of sub-divided solid catalyst particles. In another aspect, this invention relates to the reactivation of sub-divided solid catalyst particles in plural fluidized shallow beds of said catalyst particles, In a further aspect, this invention relates to a novel contacting means or apparatus for effecting the contacting of fluid streams by passing same transversely through a fluidized plural moving bed of finely divided solid particles.

In the dehydrogeneration of a hydrocarbon to produce products that are hydrocarbons of a greater degree of unsaturation, it is desirable to furnish the heat of reaction by using the sensible heat of both the hydrocarbon feed and the catalyst. If this is done in a fixed bed, the catalyst is heated during the regeneration step to as high a temperature above the reaction temperature as possible without damaging the catalyst and then preheated hydrocarbon feed is passed through the catalyst bed where the hydrocarbon is partially dehydrogenerated. After a short time the catalyst bed will have cooled to a level where dehydrogenation practically ceases. The catalyst bed must then be reheated and the cycle repeated. It is also known to pass dehydrogenation feed through small tubular reactors containing catalyst. The catalyst tubes are heated by a heat exchange fluid passed over the tubes. These operations are cyclic and the equipment to carry out the operations are therefore relatively expensive to build and operate. A continuous process is much more desirable.

The process can be carried out continuously in a cocurrent reactor. In this type of operation, the catalyst and hydrocarbon are separately and continuously heated to some allowable temperature above the reaction temperature and then fed together to an elongated reactor through which they flow cocurrently as a dispersed catalyst phase in the gas stream, with both phases supplying sensible heat to carry out the reaction. The relative rates of hydrocarbon and catalyst flow are determined by the heat requirements and the preheat temperatures permitted. The density of the catalyst dispersion in the reactor is determined by the reaction rate required. Although the density of the catalyst dispersion and the relative rates of flow of the two phases are independent, to a degree, conditions may be such that, to obtain a suitably uniform dispersion of catalyst in the hydrocarbon and at the same time the required density of dispersion, it is necessary to circulate more catalyst than is demanded by the heat requirement. Although operable, this extra catalyst circulation is undesirable because of increased operating costs.

Another type of apparatus that can be used to carry out this continuous operation is the fluidized-bed reactor. However, the deep bed of the ordinary type of fluidized-bed reactor is a serious disadvantage when used for hydrocarbon dehydrogenation. A deep bed results in a considerable pressure drop through the bed. In dehydrogenation, particularly to the dienes, a low pressure, preferably atmospheric or less than atmospheric, is desirable to favor the dehydrogenation reaction. A high pressure drop through the catalyst bed necessarily requires that part of the hydrocarbon be reacted at undesirably high pressures. Other undesirable results of the deep bed are: unnecessary erosion of the excess catalyst, undesirable degradation reactions because of the presence of a far larger amount of catalyst than is needed for the dehydrogenation, and the inevitable presence of much inactive catalyst because of the continual and thorough mixing of the bed.

Accordingly, an object of the present invention is to provide a method for effecting the contacting and transfer of sub-divided solid particles at a plurality of levels in a continuous multiple zone contacting unit.

Another object of this invention is to provide method and apparatus for contacting finely divided solids with reactant fluids whereby pressure drop during contacting is low and wherein solids residence time can be varied independently of solids feed rate.

Another object of this invention is to provide a novel contacting apparatus having plural fluidized shallow moving beds of sub-divided solid particles.

A further object of this invention is to provide method and apparatus for effecting a dehydrogenation reaction in a conversion zone containing a series of spaced relatively thin fluidized beds of finely divided catalyst.

Other objects and aspects as well as the several advantages of the invention will be apparent to one skilled in the art upon a further consideration of the specification, the drawings, and the appended claims.

Broadly, the present invention provides a fluidized moving bed operation wherein sub-divided solid particles are passed in alternate directions across the conversion zone and wherein the beds of sub-divided solid particles are fluidized by the fluid reactant contacted therewith.

Thus, in accordance with the present invention, vapors or gases are passed through a reaction zone or vessel containing a series of superimposed contact chambers or layers in a direction transverse to the flow of finely divided fluidized solids being contacted in each of said layers. The vapors or gases are preferably passed upwardly through the reaction zone and the finely divided solid particles, which are introduced onto each layer from alternate sides of the reaction zone and removed from the side diametrically opposed from the point of introduction, thus moving transversely across the reaction zone. The velocity of the upflowing vapors or gases is so adjusted that the solid particles are fluidized and simulate a liquid on each layer.

The present invention, therefore, relates to a novel fluidized bed reaction zone or contactor that obviates to a considerable degree not only the objectionable features of the ordinary fluidized bed but also permits a far greater flexibility than is possible in the cocurrent reactor by independently adjusting the solid particle and gas residence times in the contactor.

The present invention can be utilized for the conversion of hydrocarbon materials such as the cracking of gas oil or heavier petroleum fractions, the reforming of petroleum fractions boiling within the motor fuel range and other reactions requiring contact of gaseous reactants with powdered solids such as for hydrogenation, dehydrogenation, polymerization, hydrocracking, and the like. It can also be used for the adsorption of certain gaseous materials from mixtures containing the same, using as adsorbent silica gel, a molecular sieve, activated carbon, or the like, or for the stripping of entrained or adsorbed hydrocarbon materials from hydrocarbon conversion catalysts preparatory to regeneration of the same, or for the desorption of adsorbed material from silica gel, molecular sieves, activated carbon, or the like, that have been utilized for gas adsorption purposes by supplying steam or inert stripping gas to the contactor. It can also be used for the regeneration of spent catalyst particles or can be used for the conversion of hydrocarbon materials by contacting the spent catalyst particles with regeneration gases. In other words, the use of the present relatively thin fluidized moving bed of particles is adaptable to the various continuous conversion operations that are presently used in connection with the fluidized and moving bed catalytic operations, both exothermic and endothermic reactions, now well known to those who are connected with the petroleum and chemical arts.

In actual operation, by passing catalyst particles or other finely divided solid particles through a conversion zone or other contacting zone in a uniform relatively thin bed or layer according to the invention, it is possible to maintain close control of the quantity of particles within the conversion zone, as well as the rate of movement. Also, if the catalyst or other solid material is maintained in a relatively thin fluidized moving bed according to the invention, it is possible to obtain relatively low pressure drops in passing a fluid reactant stream through the solid contact material. This means that a relatively low overall pressure system can be used. This is particularly advantageous for some catalytic contacting operations, such as, for example, dehydrogenation, e.g., the dehydrogenation of butane. However, it is within the scope of the invention to utilize same for other highly endothermic and exothermic reactions in which a gas or vapor contacts a subdivided solid particulate material, especially solid finely divided catalyst, in plural shallow beds of fluidized solid contact materials.

A better understanding of the invention will be obtained upon reference to the accompanying illustrative drawings, in which FIGURE 1 is a schematic flow diagram embodying a reaction zone of the invention, partly in section, used for contacting a reactant feed such as butane with a dehydrogenation catalyst in combination with a reactivation zone for regenerating used catalyst;

FIGURE 2 is another embodiment of the contacting apparatus of the invention wherein plural inclined contacting beds of solid particulate materials are provided wherein fresh particulate material and used particulate material are introduced and removed separately from each bed according to the invention;

FIGURE 3 is a sectional view looking downwardly onto one of the contacting bed supports of FIGURE 2, which is also provided with suitable means for introducing and removing particulate solids from the contacting bed support.

Figure 1:
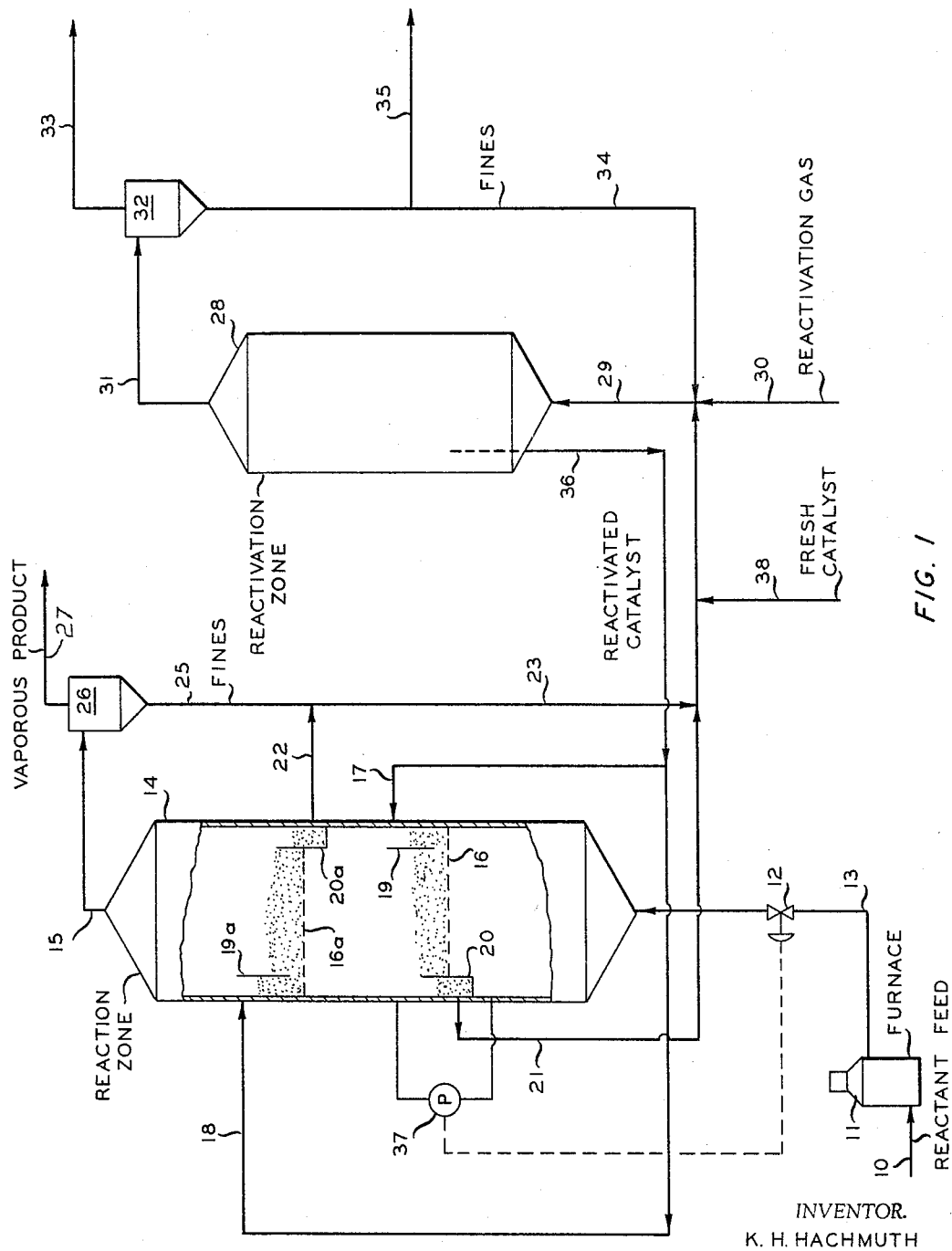

Referring now to FIGURE 1, a reactant feed, such as butane to be dehydrogenated, is passed by way of line 10 to furnace 11 wherein it is preheated to a dehydrogenation temperature, e.g., a temperature in the range of 1050–1250. The reactant feed after being heated in a furnace 11 is passed through control valve 12, line 13, and then introduced into the base of reaction or contacting zone 14, which can be of any desired shape. An outlet conduit 15 is provided at the top of zone 14 for removing vaporous product overhead. Reaction zone 14, which is partially cut away, is illustrated as having two perforated tray members 16 and 16a as catalyst supports extending across the cross-section of reaction zone 14. Support members 16 and 16a carry a shallow fluidized bed of catalyst thereon. Fresh or reactivated heated catalyst is introduced onto tray 16 by way of line 17 and onto tray 16a by way of line 18.

As shown in FIGURE 1, fresh heated catalyst is introduced onto trays 16 and 16a on diametrically opposed sides of reaction zone 14. Tray members 16 and 16a are each provided with vertical baffle members 19 and 19a, respectively, to provide a space for introduction of fresh heated catalyst into the reaction zone at each catalyst level. The sides opposite from members 19 and 19a, respectively, are provided with catalyst withdrawal wells and weir members 20 and 20a. Used catalyst is removed from tray 16 by way of line 21 and from tray 16a by way of line 22. Thus, according to the invention fresh catalyst is introduced onto each catalyst level on one side of the reactor and used catalyst removed from the same level and the reactor on a side diametrically opposed. Furthermore, fresh catalyst and used catalyst are removed from alternate sides of the reactor. Although only two trays are shown in reaction zone 14, it should be realized by those skilled in the art that any suitable number of trays desired can be used depending upon the particular contacting operation.

Product stream 15 removed overhead from reaction zone 14 is passed to separator 26 wherein catalyst fines carried overhead are separated out and recovered in line 25. The vaporous product is recovered from separator 26 by line 27 for further processing, as desired. Catalyst fines in line 25, used catalyst in lines 22 and 23, as well as used catalyst in line 21, are all combined and passed to the base of reactivation zone 28 by way of line 29. A reactivation gas is introduced into catalyst line 29 by way of line 30. Suitable reactivation gases including air, oxygen, as well as other known reactivation gases can be used. Zone 28 is illustrated as a fluidized bed reactivation system, but can be similar to zone 14 in construction and operation. The regeneration gas after reactivating the catalyst in zone 28, together with some catalyst fines, is removed overhead through line 31 and passed to separator 32. The reactivation gas, freed of catalyst fines, is removed by way of line 33 and can be returned to reactivation zone 28 by recycling to line 30. Catalyst fines separated in separator 32 are passed by way of line 34 back to reactivation zone 28. If desired, a portion of the fines can be removed continuously or periodically from the system by way of line 35, and fresh make-up catalyst added by way of line 38. If desired, fresh catalyst can be introduced (not shown) into line 36 by line 38.

Reactivated catalyst is removed from the base of reactivation zone 28 by way of line 36 and passed to reaction zone 14. A portion of the freshly reactivated catalyst is passed by way of line 17 and introduced onto tray 16. Another portion of the freshly reactivated catalyst is passed by way of line 18 and introduced onto tray 16a. It will be noted from the drawing that the freshly reactivated catalyst is introduced into trays 16 and 16a on diametrically opposed sides of reaction zone 14.

The thin moving bed of catalyst on trays 16 and 16a is fluidized by the reactant feed introduced into the base of reaction zone 14. In actual operation, a transversely moving bed of fluidized catalyst is provided on each of trays 16 and 16a. The catalyst is introduced on one side of the reaction zone and removed from the opposite side of each tray. The rate of flow of reactant feed is regulated by differential pressure controller 37 which senses the pressure drop across one of the catalyst beds. The pressure drop normally will range from 1 to 50 inches of water per tray.

Referring now to FIGURES 2 and 3, another embodiment of a contactor of the invention is illustrated. FIGURE 2 is a vertical sectional view of an apparatus according to the invention having two inclined catalyst beds. FIGURE 3 is a horizontal sectional view of the reactor illustrated in FIGURE 2 looking down on one of the inclined catalyst beds and support members. Contactor 40 is illustrated in FIGURE 3 as being rectangular in shape.

Referring specifically to FIGURE 2, a reactant feed material is introduced into the base of contactor 40 by way of inlet 41 and then is passed into plenum chamber 42 below louvered tray 43. Guide vanes can be utilized in plenum chamber 42 to direct the flow of vaporous or gas reactant feed through tray 43 introduced into the base of contactor 40 by way of inlet 41. The guide vanes, when used will assist in distributing the gas uniformly throughout the length of louvered tray 43. The reactant gas passes through the louvers and upwardly transversely through the moving solid particles moving on tray 43 from the fresh particle inlet toward the used particle outlet. The catalyst or solid particles flowing downwardly by gravity on louvered tray 43 are fluidized by the reactant feed passing upwardly therethrough. Tray 43 can be louvered as indicated in the drawing or can be a perforated plate or other suitable solid particle support through which gas can be passed for fluidizing the particles thereon and contacting therewith. Furthermore, the tray can be flat or can be contoured to provide different depths of particles at different points across the particle bed.

The reactant gas after contacting the thin or shallow bed of fluidized catalyst on louvered tray 43 passes upwardly into a second plenum chamber 44 which can also be provided with guide vanes, not shown, when desired, to reduce undesirable eddy currents, etc. Provision of guide vanes in plenum chamber 44 serves to direct the flow of reactant gas in substantially a streamline manner between trays and through an inclined louvered tray 45 above the vanes. Louvered tray 45 is inclined in a direction opposite to that of louvered tray 43. The gas flows through louvered tray 45 and upwardly transversely to the catalyst flowing downwardly thereon and fluidizes same and contacts the particles flowing on tray 45. The reactant gas after contacting the solid particles on tray 45 enters a third plenum chamber 46 and then is removed from contactor 40 by way of product outlet 47. Plenum chamber 46 can also be provided with guide vanes if desired. Also, heat exchange coils can be provided in vessels 14 or 40 when desired.

Fresh solid particles, e.g., finely divided catalyst, is introduced onto tray 45 by way of inlet 48 and then distributed onto tray 45 by particle feeder valve 49. Valve 49 can be a star valve or other suitable solid particle distributing device. On the opposite side of contactor 40 a catalyst discharge means 50 is provided for removing the catalyst from tray 45 and contactor 40. As illustrated in the drawing, the tray slopes downwardly toward the catalyst outlet from the catalyst feed inlet. Similarly, for tray 43, fresh solid particles, e.g., catalyst particles, are introduced onto the tray and into the contactor by way of inlet 51 and feeder valve 52. Used solid particles are removed from the opposite side of contactor 40 by way of conveyor 53 and outlet 54.

In actual operation, two independent but essentially equal streams of preheated fresh and/or regenerated solid particles, e.g., catalyst, enter contactor 40, one stream for each of beds 43 and 45. As illustrated in FIGURE 3, each stream of solid particles entering contactor 40 enters through diverging pipe leading to an elongated star valve or the equivalent running the full width of the solid particle bed. The rate of rotation of this valve determines the rate of solid particle feed. The solid particles flow uniformly across the support trays to a used particle removal mechanism at the other end of the bed. For purposes of illustration, this removal mechanism is shown as a double end spiral conveyor delivering the spent particles to two external solid particle discharge spouts, one on each side of the lower end of each bed.

The slope, dimensions, weir heights, hole or louver size, and other characteristics of support trays 43 and 45 will determine the thickness of the solid particle bed thereon so that the solid particle residence time can be varied independently of the solid particle feed rate. Since the spiral conveyor removing solid particles from each bed will usually run "choked," it will often be preferred to use a spiral of increasing pitch from center outward to remove the solid particles uniformly across the bed. Alternatively, another elongated star valve or its equivalent can be used.

Although the invention is applicable broadly to the fluidized contacting of sub-divided solid particles, it is preferably employed for contacting solid catalyst particles in moving fluidized beds. Flow through the contactor and catalyst beds is essentially streamlined so that gas that has contacted the relatively cool and partially deactivated catalyst at the discharge end of the first tray (tray 43 in FIGURE 2) will contact the incoming hot fresh catalyst at the inlet end of the second tray (tray 45 in FIGURE 2). Similarly, the gas that has contacted the hot fresh catalyst at the inlet end of the first tray (tray 43) will contact the relatively cool and partially deactivated catalyst at the discharge end of the second tray (tray 45). Thus, all parts of the gas stream will receive approximately equivalent exposure insofar as average catalyst temperature and activity is concerned. Although only two contacting trays are shown in zone 40, it should be realized that any suitable number can be employed depending upon the particular contacting operation.

The maximum gas velocity through the contactor and beds is limited only by the transfer velocity of the catalyst particles or other solids, and the minimum gas velocity is such that "weeping" of catalyst or solids through the perforations in the support trays does not occur. Temperatures that can be employed with the contactors of the invention are limited only by the properties of the catalyst or other contact material, the reactant gas(es) and the materials of construction. Pressures used can range from about 0.05 to about 70 atmospheres. Catalyst feed rate across the beds is determined by the heat input necessary. Catalyst residence time, which can be varied independently, and catalyst feed rate, are adjusted to obtain the maximum yields of desired product from the gas being reacted.

The reactors or contactors described in connection with FIGURES 1–3 have been described using an endothermic reaction primarily; however, it is equally adaptable to use an exothermic reaction wherein the catalyst is cooled, before being fed to the support trays. In both instances, catalyst inventory and catalyst erosion are minimized according to the invention.

The catalyst to reactant ratio, which is the ratio of the weight of catalyst in the reactor to the weight of reactant entering the reactor per unit time, can be varied in the conversion or contacting zone by regulating both the thickness of the bed of catalyst particles which passes transversely through the zone and the rate of movement of the bed, and/or by varying the flow of reactant. The control of the rate of movement of the particles will, of course, depend upon specific construction details relating to the supporting means for the particles in a moving bed, and upon the means for feeding and regulating the depth of the bed at the inlet end of each conversion zone or bed. Ordinarily the depth of the solid particle beds will vary from about 1 inch to about 8 inches.

It will be noted from the above description that substantially all of the particles are utilized to a high degree in each of the contacting zones (catalyst trays), and as a result, a relatively low catalyst inventory can be maintained within the system and within each of the conversion zones to effect a desired degree of total conversion. The relatively thin fluidized moving bed of solid catalyst particles, as described above, is of advantage in that the unit can operate at relatively low pressure drop through each contacting zone, and thus maintain a relatively low operating pressure for the entire system. The reactor or contactors according to the invention also make possible and commercially feasible the use of a large bed rather than a multitude of small tubular reactors.

The catalysts that can be used in the practice of the invention are those known to the industry for the particular reaction being conducted in the reactor of the invention. In dehydrogenation, for example, they can consist predominantly of one or more metal oxides such as alumina, zirconia, magnesia, chromia, and mixtures thereof, and the like, formed to a desired size, or, alternatively, the catalyst can comprise a form of crushed granular material prepared from a naturally occurring mineral. It is preferable to have the particles of a relatively uniform and well graded size in order to avoid attrition of the particles and the presence of substantially large quantities of fine particles of a powdery or dusty nature.

A better understanding of the invention will be obtained upon reference to the following illustrative examples which are not to be interpreted as being unduly limitative of the invention.

EXAMPLE I

Figure 7:
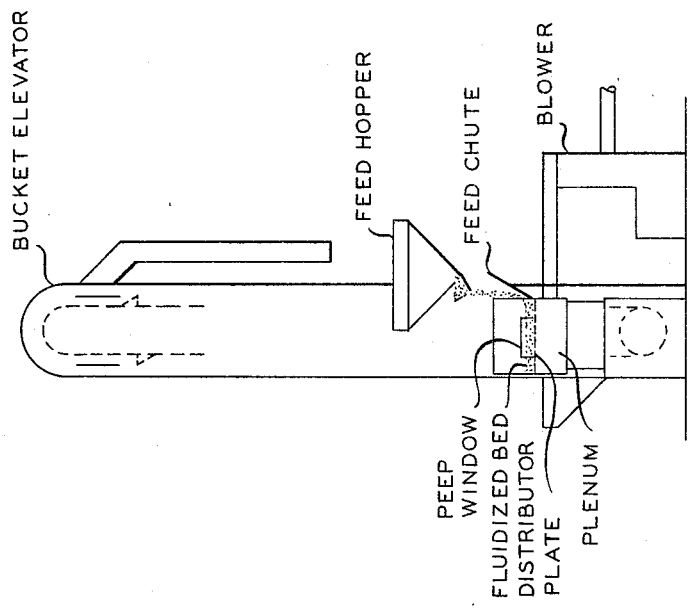

To demonstrate the operability of the fluidized-bed reactor of the present invention, tests were made in which thin layers of finely divided solids were moved rapidly across a large fluidized bed with uniform bed expansion, velocity, and depth, such that the contact time between gas and solids was substantially constant over the entire bed area. These tests were made with a 30" x 30" reactor which had a distributor plate with 1/8-inch diameter holes on a 5/8-inch triangular pattern. In separate tests it was found that holes up to 1 inch in diameter could be used, and that 1/2 to 1 inch was best. A 15-horsepower, 1900 c.f.m. blower was used to supply air for the fluidizing gas. A 40–60 mesh sand was used as simulated catalyst. A 2000 lb./min. bucket elevator was used to recirculate the sand. Arrangement of the apparatus is shown in FIGURE 7. The sand entered one edge of the bed by gravity as it fell approximately 18 inches from a metering gate on the storage hopper onto a chute extending from the bed. The sand left the opposite side of the bed by spilling directly off the distributor plate, or by spilling over the top of a weir when it was used. The sand was returned to the storage hopper by the bucket elevator.

Figures 4, 5:
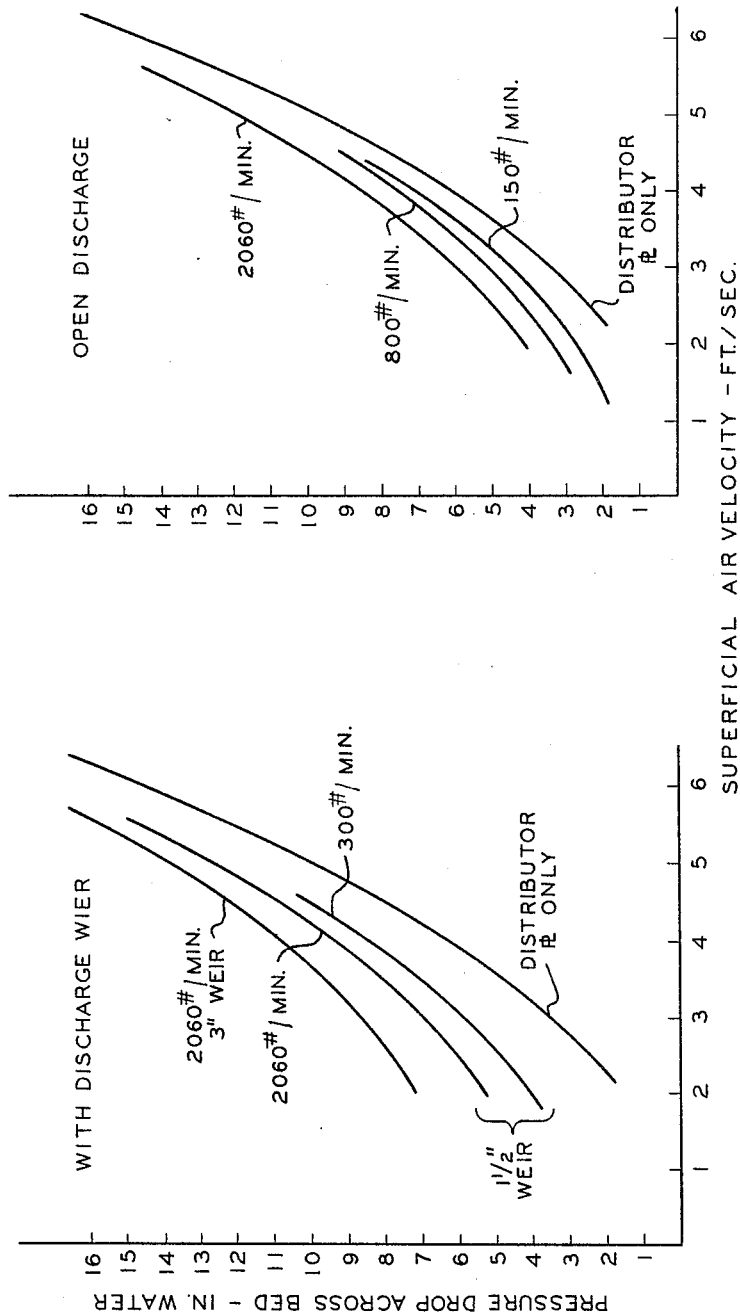
FIGURES 4–7 are graphs and an experimental apparatus operated according to the invention described in more detail in connection with specific Example II hereinbelow.

The sand was fluidized uniformly over the area of the bed at all sand rates tested and at all air velocities except the lowest. At low air velocity an obstruction momentarily placed in the bed would create a local stagnant area of sand which could be fluidized by the air pressure available at the distributor plate. Overflow weirs 1.5 and 3 inches in height were used effectively on the discharge of the bed to increase bed depth. The tendency for an obstruction in the fluidized bed to create a stagnant area is most critical at low air velocities and with deep beds. FIGURES 4 and 5 show the pressure drop across the bed as a function of air velocity at different sand rates and with different weirs. To obtain generally uniform and stable fluidization over the area of the bed the pressure drop across the distributor plate alone had to be approximately equal to, or greater than, the pressure drop created by the sand on the distributor. This produced relatively uniform air distribution and fluidization in spite of any local temporary disturbances in sand distribution that were introduced. At the highest air velocities the transport of sand over the top becomes appreciable. The maximum rate at which sand could be moved across the bed was limited in the tests only by the ability of the bucket elevator to recirculate the sand.

The depth of the fluidized bed of sand varied from 1 to 1.5 inches at low sand rates and low air velocities with no discharge weir to about 8 inches at 2060 lb./min. sand and 5.6 ft./sec. air velocity with the 3-inch weir in place. The density of the fluidized sand was estimated to be from 80–90 percent of its normal bulk density at the lower air velocities to 50–60 percent at the highest air velocities.

EXAMPLE II

Figure 6:
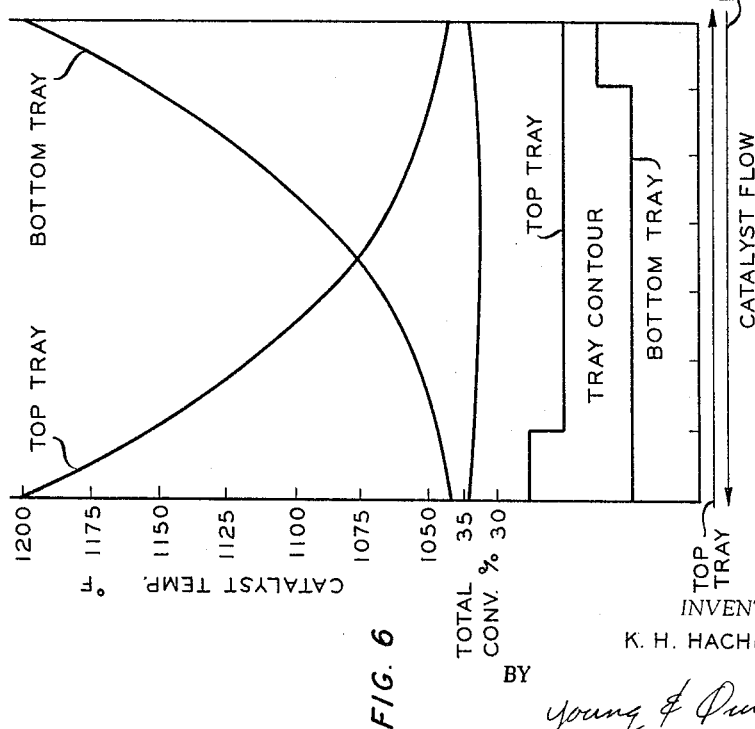

Normal butane is dehydrogenated at atmospheric pressure in a two-tray reactor in which the trays are horizontal and have 1/4-inch holes to permit upward flow of the hydrocarbon vapor through the trays. A 140–300 mesh (U.S. Sieve) 20 chromia-80 alumina microsphere catalyst is introduced at a temperature of 1200° F. at the left side of the top tray and the right side of the bottom tray and is removed for regeneration at the opposite side of each tray. Normal butane enters the reactor at a temperature of 1150° F. Total reciprocal space velocity is 75 pounds of catalyst per pound of normal butane. Tray contours, catalyst temperature profiles, and total conversion profile are shown in FIGURE 6. It is evident that conversion level is held almost constant across the catalyst bed. As a result of this type of operation, conversion to undesirable byproducts such as coke and light gases is minimized and conversion to normal butenes is maximized—i.e., selectivity is higher than in either the cocurrent or the fluidized bed reactors known to the industry.

A particular advantage obtained by the present method of operation, having the relatively thin bed of moving fluidized catalyst particles, is the accompanying low pressure drops. The reactant streams can be introduced into the contacting chambers at relatively low pressures and the chambers can be constructed more in the manner of known low pressure apparatus. The contacting chambers can, in general, be of a rectangular shape rather than of the circular pressure type of construction normally employed for catalytic conversion operations. Preferably, the contacting chamber is relatively long and narrow such that the moving catalyst bed does not have too great a width and can readily maintain a substantially uniform thickness as it passes across a chamber transversely to the fluidizing reactant medium.

The foregoing description contains a limited number of embodiments of the present invention, and it will be understood, however, that numerous variations are possible without departing from the scope and spirit of the following claims.

I claim:
1. A method for contacting a fluid stream with subdivided solid particles which comprises,
   providing a plurality of spaced shallow beds of subdivided solid particles in a confined contacting zone, each of said beds being fed with fresh solid particles on one side of said zone and contacted solid particles being removed from said zone from the side opposite of the introduction of solid particles with the further proviso that fresh solid particles are fed onto each succeeding bed from alternate sides of said zone,
   introducing a fluid stream into one end of said zone and passing same through said zone and said solid particle beds at a velocity such that each of said beds is fluidized, and
   removing a fluid stream from said zone for further processing from an end opposite said first end.

2. The method of claim 1 further characterized in that
   fluid solid particles in each of said beds move in a relatively thin fluidized bed in a descending gravity flow through said zone from the side of fresh catalyst introduction toward the side of used catalyst removal over sloping perforate supports, each of said beds sloping in a direction opposite the next adjacent bed, and
   said fluid stream is introduced into contact with each of said descending beds of solid particles in a manner providing for the substantially transverse flow of said medium to the direction of flow of the moving bed of fluidized particles.

3. The method of claim 1 further characterized in that
   said zone is substantially vertical,
   said beds are substantially horizontal,
   said fluid stream is introduced into the base and removed from the top of said zone and
   said fluid stream after contacting a bed of said solid particles is directed upwardly and substantially vertically into contact with the next bed of solid particles, whereby a given volume of said stream passes upwardly through said zone and contacts each of said beds in substantially the same vertical plane.

4. A method for dehydrogenation which comprises,
preheating a dehydrogenatable feed material to a dehydrogenation temperature,
introducing said preheated feed into a lower portion of a dehydrogenation zone containing a series of spaced shallow fluidized beds of finely divided dehydrogenation catalyst,
introducing fresh heated dehydrogenation catalyst into said zone and onto each of said beds from alternate sides of said dehydrogenation zone,
withdrawing used dehydrogenation catalyst from each of said beds and from said zone from the side opposite that where fresh dehydrogenation catalyst is introduced into said zone and each bed so as to provide a transversely moving bed of catalyst with respect to the flow of said feed through said zone,
flowing said preheated feed to said zone and into contact with said dehydrogenation catalyst on each of said beds at a velocity such that the dehydrogenation catalyst on each bed is fluidized by said feed, thereby effecting dehydrogenation of said feed by contacting same with said catalyst, and
removing from an upper portion of said zone dehydrogenation product.

5. The method of claim 4 further characterized in that
said catalyst particles move in a relatively thin fluidized bed in a descending gravity flow through said zone over sloping perforate bed supports, and
said preheated feed is introduced into contact with said descending bed of catalyst particles in a manner providing for the substantial transverse flow of said feed through each of said relatively thin beds of catalyst.

6. The method of claim 4 further characterized in that,
said feed comprises butane,
said catalyst comprises chromia-alumina.
said zone contains two relatively shallow fluidized beds of said chromia-alumina catalyst, said beds being substantially perpendicular with respect to the flow of said butane, and
the rate of flow of butane and the depth of each bed is such that the pressure drop across each bed is in the range of 1 to 50 inches of water.

7. A unitary apparatus for effecting contact between a fluid stream and sub-divided solid particles and wherein said solid particles are fluidized by said fluid stream which comprises, in combination;
a substantially vertical enclosed contacting vessel;
an opening at the base of said vessel for introducing said fluid stream and an opening at the top of said vessel for removing said stream after contacting the plurality of beds of solid particles in said vessel;
a series of vertically spaced perforated tray members extending across the cross-section of said vessel whereby a bed of said particles on each of said tray members can be formed; and
particle inlet means for introducing fresh solid subdivided particles into said vessel onto one side of each of said tray members and particle outlet means for withdrawing used solids from said vessel and each tray member on the side opposite of the means for introducing fresh solids, said particle inlet means and said particle outlet means being disposed in diametrically opposed relation from tray to tray so that fresh solids are introduced into said vessel in alternate directions along the length of the vessel.

8. The apparatus of claim 7 further characterized in that said tray members are inclined perforate particle supporting means extending laterally across said vessel from a particle inlet thereof to the particle outlet.

9. The apparatus of claim 7 further characterized in that said tray members are substantially horizontal perforate particle supporting means extending laterally across said vessel from the particle inlet thereof to the particle outlet, further provided with a vertical baffle element near the particle inlet to distribute incoming particles evenly onto bed particle supporting means and weir means at the particle outlet to allow withdrawal of used particles from said supporting means in said vessel and to also provide a shallow bed of particles on said particle supporting means.

10. The apparatus of claim 7 further characterized in that said vessel is provided with guide vanes below the lowermost of said tray members and between each pair of tray members so as to provide substantially streamlined flow of said fluid stream through said vessel and direct the flow of said fluid stream through said vessel in a manner that a given volume of said stream contacts each bed of particles substantially in the same vertical plane as said volume passes through the vessel.

References Cited by the Examiner
UNITED STATES PATENTS 2,520,983  9/1950  Wilcox _____ 208—164
2,702,742  2/1955  Hillard _____ 23—288.3
2,797,908  7/1957  Zubrzycki _____ 263—21

DELBERT E. GANTZ, *Primary Examiner.*

G. E. SCHMITKONS, *Assistant Examiner.*